E. SCHLENKER.
Internal Gearing of Elevators
No. 166,722. Patented Aug. 17, 1875.
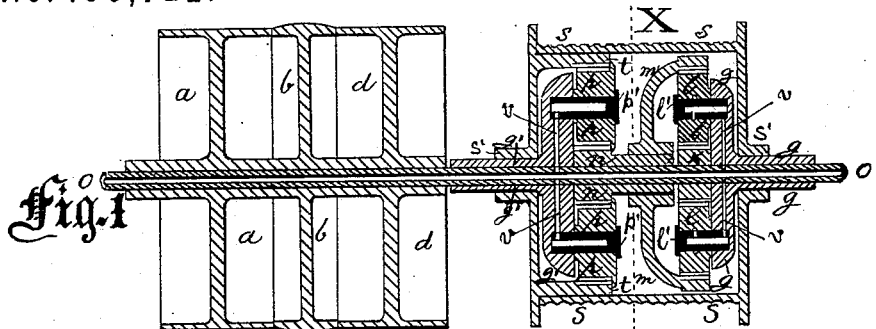
Fig. 1
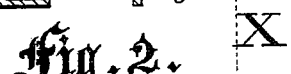
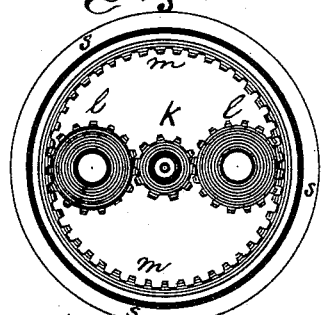
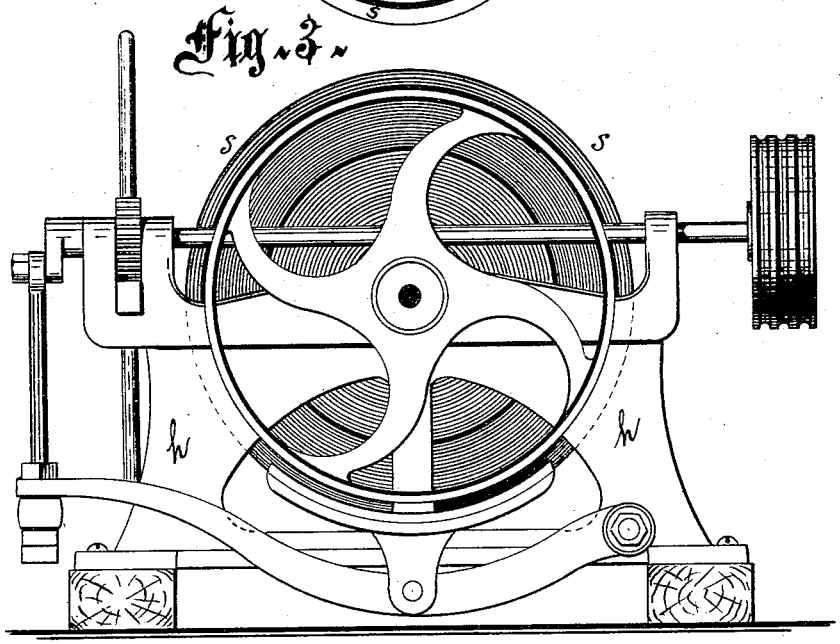
Witnesses.
Inventor.
Erhard Schlenker

UNITED STATES PATENT OFFICE.

ERHARD SCHLENKER, OF BUFFALO, NEW YORK, ASSIGNOR OF ONE-HALF HIS RIGHT TO RUFUS L. HOWARD AND GIBSON F. HOWARD, OF SAME PLACE.

IMPROVEMENT IN INTERNAL GEARINGS OF ELEVATORS.

Specification forming part of Letters Patent No. 166,722, dated August 17, 1875; application filed February 23, 1875.

*To all whom it may concern:*

Be it known that I, ERHARD SCHLENKER, of the city of Buffalo, in the county of Erie and State of New York, have invented certain Improvements in Gearing for Elevators, of which the following is a specification:

My invention relates to improvements in the gearing of the drums of elevators; and the invention consists in certain new and improved combinations of devices whereby the mechanism for operating the drum is arranged within it, securing economy of space, protection from dust and other extraneous matter, while, at the same time, increasing the strength and durability of such mechanism, all as hereinafter more fully set forth.

In the accompanying drawings, Figure 1 is a vertical sectional view, showing the interior of the winding-drum and the arrangement of the pulleys on the shaft. Fig. 2 is a cross-section of the winding-drum on the line $x\ x$, Fig. 1. Fig. 3 is an end elevation of the hoisting apparatus.

Referring to the parts by letters, O represents a hollow shaft, on which the hoisting apparatus is journaled and revolves. $a\ a$ and $d\ d$ represent loose pulleys mounted on said shaft, and $b\ b$ a fast pulley securely keyed thereto. By means of these pulleys and belting motion is imparted to the hoisting-drum or to the shaft O, on which the drum is journaled. By means of perforations in the hollow shaft oil may be introduced to the internal gearing, the shaft being filled with oil for that purpose, suitable automatically-operating devices being provided to regulate the flow of the oil from the shaft to the gearing. $g\ g'$ represent fixed bearings, which are secured to and supported in place by the external framing $h\ h$, or other suitable support. The shaft O passes through these bearings and revolves freely therein. K is a small pinion, keyed to the shaft O, so as to turn with it. This pinion meshes with two small gears, $l\ l$, turning in opposite directions. These gears $l\ l$ are keyed to short shafts $l'\ l'$, which have their bearings in the inner enlarged ends of the bearings $g$. The gears $l\ l$ mesh with a large gear, $m$. $n$ is another pinion having an elongated hub, to which the large gear $m$ is securely keyed, so that they turn together. The pinion $n$ meshes with two small gears, $p\ p$, similar to the gears $l\ l$, the said gears $p\ p$ being keyed to short shafts $p'\ p'$, which have their bearings in the inner enlarged ends of the bearings $g'$. The gears $p\ p$, in their turn, mesh with a large gear, $t$, secured to the inner periphery of the hoisting-drum S, the latter having its bearings at S' S' in the bearings $g\ g'$.

Devices for shifting the belting, &c., are shown in Fig. 3; but as they do not form any part of the invention which I desire to secure by these Letters Patent, they need not here be described.

From the foregoing description it will be seen that the power is transmitted to the gears $l\ l$ from the shaft O by means of the pinion K, and from the gears $l\ l$ to the large gear $m$ and pinion $n$, and from thence, by the gears $p\ p$, to the hoisting-drum S; and it will be obvious to those skilled in the art that great power is thus obtained within the comparatively-small compass of the hoisting-drum itself; and it will also be obvious that, by arranging the gearing in this way, it is protected from dust and other extraneous matter.

Passages $v\ v$ for the oil are shown in the bearings $g\ g'$, connecting the hollow shaft O with the short hollow shafts $l'\ l'\ p'\ p'$, and from thence passages lead to the journals and gearing, so that, a supply of oil being maintained in the shaft O, the internal gearing of the drum is lubricated automatically.

Having thus described my invention, what I claim as new, and desire to secure by Letters Patent, is—

1. The combination of the shaft O, pinion K, and gears $l\ l$, gear $m$, and pinion $n$ with gears $p\ p$ and gear $t$, the latter secured to, and all arranged within, the drum S, substantially as and for the purpose specified.

2. The bearing-frames $g\ g'$, secured to the stationary frame of the machine, and arranged so as to form bearings for the shafts O, $l'\ l'$, and $p'\ p'$, wheel $n$, and drum S, substantially as specified.

ERHARD SCHLENKER.

In presence of—
P. P. BURTIS,
SOLOMON FINLEY.